United States Patent
Chappelier et al.

(10) Patent No.: US 11,481,477 B2
(45) Date of Patent: Oct. 25, 2022

(54) METHOD FOR RECORDING A MULTIMEDIA CONTENT, METHOD FOR DETECTING A WATERMARK WITHIN A MULTIMEDIA CONTENT, CORRESPONDING DEVICES AND COMPUTER PROGRAMS

(71) Applicant: LAMARK, Rennes (FR)

(72) Inventors: Vivien Chappelier, Saint-Aubin-d'Aubigne (FR); Mathieu Desoubeaux, Rennes (FR); Jonathan Delhumeau, Rennes (FR)

(73) Assignee: LAMARK, Rennes (FR)

( * ) Notice: Subject to any disclaimer, the term of this patent is extended or adjusted under 35 U.S.C. 154(b) by 452 days.

(21) Appl. No.: 16/467,332

(22) PCT Filed: Nov. 28, 2017

(86) PCT No.: PCT/EP2017/080731
§ 371 (c)(1),
(2) Date: Jun. 6, 2019

(87) PCT Pub. No.: WO2018/104114
PCT Pub. Date: Jun. 14, 2018

(65) Prior Publication Data
US 2019/0318067 A1     Oct. 17, 2019

(30) Foreign Application Priority Data
Dec. 7, 2016 (FR) ...................... 1662087

(51) Int. Cl.
*G06F 21/16* (2013.01)

(52) U.S. Cl.
CPC ...... *G06F 21/16* (2013.01); *G06F 2221/0733* (2013.01)

(58) Field of Classification Search
CPC ............. G06F 21/16; G06F 2221/0733; G06F 16/532; G06T 1/0021; G06T 7/0008
See application file for complete search history.

(56) References Cited

U.S. PATENT DOCUMENTS 8,031,979 B2 * 10/2011 Nguyen ................ G06F 16/951
382/305
9,092,458 B1 * 7/2015 Perona ................ G06F 16/5838
(Continued)

FOREIGN PATENT DOCUMENTS

FR     2860378 A1     4/2005

OTHER PUBLICATIONS

English translation of the Written Opinion of the International Searching Authority dated Jan. 19, 2018 for corresponding International Application No. PCT/EP2017/080731, filed Nov. 28, 2017.
(Continued)

*Primary Examiner* — Linglan Edwards
(74) *Attorney, Agent, or Firm* — David D. Brush; Westman, Champlin & Koehler, P.A.

(57) ABSTRACT

A method and apparatus for digital watermarking, recording multimedia contents, as well as detection, by using data recorded in a base, of potentially infringing multimedia contents. The method is based on a watermarking done in conjunction with the recording of specific data in a data base, this data being thereafter used to detect a watermark, if any, in an infringing content in using or not using the original content.

10 Claims, 2 Drawing Sheets

(56) References Cited

U.S. PATENT DOCUMENTS

| | | | | |
|---|---|---|---|---|
| 9,367,885 | B2* | 6/2016 | Hua | H04L 67/02 |
| 9,596,521 | B2* | 3/2017 | Winograd | H04N 21/435 |
| 10,504,200 | B2* | 12/2019 | Winograd | H04L 67/561 |
| 2005/0105798 | A1* | 5/2005 | Nguyen | H04N 1/32149 |
| | | | | 382/181 |
| 2008/0270373 | A1 | 10/2008 | Oostveen et al. | |
| 2015/0324947 | A1* | 11/2015 | Winograd | H04L 65/612 |
| | | | | 382/100 |
| 2016/0196631 | A1 | 7/2016 | Master et al. | |

OTHER PUBLICATIONS

International Search Report dated Jan. 19, 2018 for corresponding International Application No. PCT/EP2017/080731, filed Nov. 28, 2017.

Written Opinion of the International Searching Authority dated Jan. 19, 2018 for corresponding International Application No. PCT/EP2017/080731, filed Nov. 28, 2017.

* cited by examiner

METHOD FOR RECORDING A MULTIMEDIA CONTENT, METHOD FOR DETECTING A WATERMARK WITHIN A MULTIMEDIA CONTENT, CORRESPONDING DEVICES AND COMPUTER PROGRAMS

CROSS-REFERENCE TO RELATED APPLICATIONS

This Application is a Section 371 National Stage Application of International Application No. PCT/EP2017/080731, filed Nov. 28, 2017, which is incorporated by reference in its entirety and published as WO 2018/104114 A1 on Jun. 14, 2018, not in English.

1. FIELD OF THE INVENTION

The invention relates to the protection of multimedia contents. More particularly, it relates to the protection of multimedia contents subject to copyright. More specifically, the invention proposes a method for the recording, within a recording and detection system, of multimedia contents by carrying out a particular recording technique. A method is also proposed for detecting previously recorded multimedia contents. The present invention makes it possible more particularly to very closely link a multimedia content to a set of surveillance data. Once typical field of application of the present invention is the management of contents protected by copyright.

2. PRIOR ART

The development of data exchanges through communications networks and more particularly through the Internet has led to a massive dissemination of multimedia contents. Now, many contents are covered by copyright. Thus, for many years now, intensive research has been conducted to enable the identification of contents under copyright. The identifying and tracking of contents is a responsibility incumbent on copyright-managing entities, who must carry out chiefly two different tasks:
  identifying the content: the content examined is identified as a copy of a work for which the copyright and related rights are managed by a copyright management entity;
  verifying the copyright: a conventional approach consists in granting a right of exploitation for a given use of the Work. The owners of the copyright must therefore check that the examined content is used in compliance with the managed copyright that has been negotiated; if this is not the case, there is an infringement of copyright; this emphasizes the fact that the multimedia content can be exploited in different ways by many different customers.

This implementation of copyright is made even more difficult by changes in rights because a copyright can evolve in the course of time: a customer can for example negotiate an extension of the time of exploitation of a Work or a publisher may negotiate a use of the Work that is different from the originally planned use. The goal in view, in order to carry out efficient management of copyright, is to very closely link a content with descriptive data on this content. Two major classes of methods for creating these "links" can be seen:
  the first class of methods consists in carrying out a particular marking (known as watermarking) of the multimedia content: the content is marked (watermarked) before being distributed and the watermark comprises descriptive data;
  the second class of methods consists of content-based retrieval or CBR enabling computers to recognize the content and make a search, in a data base, for descriptive data associated with this content.

Content-based retrieval (CBR) takes place in two phases: a registration phase and a recognition phase. According to the principle of this technology, a compact representation of the visual and/or auditory content of a work is extracted from a piece (a part) of the content. This compact representation takes the form of a vector or a set of vectors. This representation is discriminatory (two non-similar pieces of content have very different representations) while being robust (near copies of a content generally share similar representations).

The problems presented by CBR operations are of two types:
1) false positive and false negative: depending on the similarity between their representations, the system must indicate whether the query corresponds to a copy of an image from the data base (i.e. the image that has the best similarity): this choice is generally resolved by comparing the similarity with a threshold; however, an excessively high threshold leads to more false negatives: the system does not recognize deformed copies of the content of the data base; conversely, an excessively low threshold leads to a greater number of false positives: the system recognizes the queries although they do not correspond to any content of the data base; this problem becomes more critical as and when the number of contents managed in the data base increases; in addition, the system does not distinguish between two similar contents of data bases: for example, images of a same event taken by two photographers in proximity to each other are considered to be an identical content;
2) multiple sources: a CBR system fails to extract accurate descriptive data when several versions of a same content exist, each with associated descriptive data: for example, when two photography agencies manage the copyright for a same image, the system identifies the Work but is incapable of specifying which version of the work is being identified, and is therefore unable to obtain accurate descriptive data corresponding to the version in question.

A second technique for managing copyright can consist in marking the content. This technique is called digital watermarking. As explained here above, one problem of CBR is that it is unable to efficiently separate two different versions of a same content. Digital watermarking permanently incorporates descriptive data into a piece of a content by modifying certain values of the content (for example the pixel for still images). The system responsible for watermarking produces watermarked contents, the perception of which is identical to that of original works, using a mathematical watermarking model that takes account of the human visual and/or auditory system.

Digital watermarking also poses problems:
1) the trade-off between payload and robustness: payload is defined as the length of incorporated message; for example, it is the number of bits encoding the message to be integrated; robustness is defined as the capacity given to the watermarking decoder to retrieve the incorporated message despite a modification of the watermarked content; one of the problems of watermarking is that there is a trade-off to be made between payload and robustness: the lengthier the watermarked message, the less likely it is that the right message can be decoded after distortion;

2) robustness against geometrical attacks: taking the example of still-image watermarking: there are watermarking techniques that offer very high robustness against compression, filtering, calibration of colors or noise; such modifications are called "volumetric" processing since they modify the value of the pixels of the image; there are watermarking techniques that offer great robustness against geometrical attacks which modify the geometry of the image such as rotation,
3) rescaling, cropping; however, very few watermarking techniques withstand a combination of both types of attacks;
4) the permanent nature of the message: another problem, for certain applications, is that the incorporated message cannot be easily modified; one solution is to retrieve the original content and insert a new watermark into this original content; a second solution is to incorporate a second watermark into an already watermarked content: this second solution impairs the perceptual quality of the content; in addition, at the decoding stage, it is not possible to tell which of the two images is the new one;
5) problem of security: a digital watermarking system needs a secret key: this is a secret parameter that is used during the watermarking and during the decoding: this parameter is not public and this prevents the reading, the modification or the erasure of the messages incorporated by unauthorized users; however, certain research work has shown that the levels of security in watermarking systems are low: this means that, by processing several contents (of the order of 100) watermarked with the same technique and the same secret key but with different messages, an attacker can come into possession of the secret key.

There is therefore a need to provide a solution for identifying and tracking multimedia contents, that is both robust and efficient and resolves at least some of the drawbacks of the prior art.

3. SUMMARY OF THE INVENTION

The present technique does not have at least some of the drawbacks of the prior art. The proposed technique can be used to identify and track multimedia contents under copyright in a simple and efficient way. More particularly, the invention proposes a method that combines the characteristics of prior-art methods but does so in a wholly novel and inventive way so as to produce a system for which there is no need for a trade-off between robustness and efficiency.

More particularly, the technique relates to a method for recording a multimedia content to be protected within an electronic device for the recording of multimedia contents, said electronic device comprising means for processing multimedia data. Such a method comprises:
  a step for receiving a multimedia content X;
  a step for obtaining a representation RX of said multimedia content X, said representation RX coming from a transformation carried out on said multimedia content X;
  a step for obtaining a unique identifier associated with said representation RX of said multimedia content;
  a step for obtaining a secret key of said multimedia content;
  a step of watermarking said multimedia content by means of a secret key, delivering a watermarked content;
  a step for obtaining at least one piece of descriptive data $DD_X$ associated with said multimedia content;
  a step of insertion, within a data base, of at least one piece of data constituting said watermark and said at least one piece of descriptive data.

According to one particular characteristic, the step of insertion within the data base comprises the insertion of a recording comprising said unique identifier, said representation and said secret key.

According to one particular characteristic, said step for watermarking said multimedia content implements a watermarking called a "zero bit" watermarking.

According to one particular characteristic, the step of insertion, within said recording of the contents of the data base, comprises the insertion of at least one part of the multimedia content.

According to one particular characteristic, the method furthermore comprises a step of insertion, into a descriptive data base, of said at least one piece of descriptive data associated with said multimedia content.

According to one particular characteristic, said at least one piece of descriptive data comprises at least one piece of data of a temporary nature and/or at least one piece of data of a permanent nature, and said pieces of data of a permanent nature are accessible solely in read mode.

According to one particular characteristic, the watermarking step comprises a step for modulating a watermarking signal as a function of a signal representing the multimedia content.

The applying of these different characteristics enables the insertion, within a recording data base, of data on the multimedia content and the execution of a watermarking that is, so to speak, independent of this data (and more particularly of the descriptive data) and therefore makes it possible to improve the robustness of the watermark while ensuring that the data is highly exhaustive and that there is a low rate of false positives during subsequent detection.

According to another aspect, a method is proposed for obtaining a piece of descriptive data associated with a multimedia content Q, the method being carried out by an electronic device for verifying multimedia contents, said electronic device comprising means for processing multimedia data. Such a method comprises the following steps:
  computing a representation $R_Q$ of the content Q;
  searching, within the indexing structure, for the representations R closest to the representation $R_Q$ of the content Q, the search delivering an ordered list of identifiers of the closest candidate representations;
  for each candidate content of the previously obtained ordered list, a step for the detection, within the content Q, of a digital watermark corresponding to one of the digital watermarks of the contents of the list, as a function of the watermarking keys associated with the contents of the list; and
    when the detection is positive, for a content $I_n$ of the list of contents, transmitting at least one portion of the descriptive data $D_n$ of the content $I_n$ to which the watermark of the content Q corresponds;
  when the detection is negative for all the contents of the list of contents, transmitting a message on absence of content Q.

According to one particular characteristic, said multimedia content Q being an image, the step for the detection, within the image Q, of a digital watermark of the images of the list comprises, for a current image $I_m$:
  obtaining the secret key $K_m$ corresponding to the $ID_m$ of the image $I_m$;
  optionally, realigning the image Q according to the structural elements of the representation $R_m$ of the image $I_m$;

detecting the watermark by means of the secret key $K_m$ and, optionally, by means of the image $I_m$.

According to one particular characteristic, the step for realigning the image Q as a function of the structural elements of the representation $R_m$ of the image $I_m$ comprises the insertion, into said image Q, of at least one part of said image $I_m$, the insertion being carried out as a function of missing parts, if any, of said image Q relative to said image $I_m$.

The implementing of these different characteristics makes it possible to obtain, from a content that may be counterfeit, data on this multimedia content because searching for a watermark, if any, in this content is not limited to contents for which the similarity with the infringing content is defined.

According to another aspect, there is also disclosed an electronic device for the recording of a multimedia content to be protected, said electronic device comprising means for processing multimedia data. This device comprises:
- means for receiving a multimedia content;
- means for obtaining at least one piece of descriptive data associated with said multimedia content;
- means for obtaining a representation of said multimedia content, said representation coming from at least one transformation;
- means for obtaining a unique identifier associated with said representation of said multimedia content;
- means for obtaining a secret key of said multimedia content;
- means for watermarking said multimedia content by means of a secret key.

According to another aspect, there is also disclosed a device for obtaining a piece of descriptive data associated with a multimedia content Q, implemented by an electronic device for verifying multimedia contents, said electronic device comprising means for processing multimedia data. This device comprises:
- means for computing a representation $R_Q$ of the content Q;
- means for making a search, within the indexing structure, of the representations R closest to the representation $R_Q$ of the content Q, the search delivering an ordered list of identifiers of the closest candidate representation;
- means of detection, within the content Q, of a digital watermark corresponding to one of the digital watermarks of the contents of the list; and
  - means of transmission of at least one portion of descriptive data $D_n$ of the content $I_n$ to which the watermark of the content Q corresponds, means implemented when the detection is positive, for a content $I_n$ of the list of contents;
- means of transmission of a message on an absence of contents Q, means implemented when the detection is negative for all the contents of the list of contents.

According to a preferred implementation, the different steps of the methods described here above are carried out by one or more software programs or computer programs comprising software instructions that are to be executed by a data processor of a relay module according to the invention, these programs being designed to control the execution of the different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Besides, the information support can be a transmissible support such as an electrical of optical signal, that can be conveyed by an element or optical cable, by radio or by other means. The program according to the invention can be especially downloaded from an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

4. DRAWINGS

Other features and advantages of the invention shall appear more clearly from the following description of a preferred embodiment, given by way of a simple illustratory and non-exhaustive example and from the appended drawings, of which:

Figure 3:
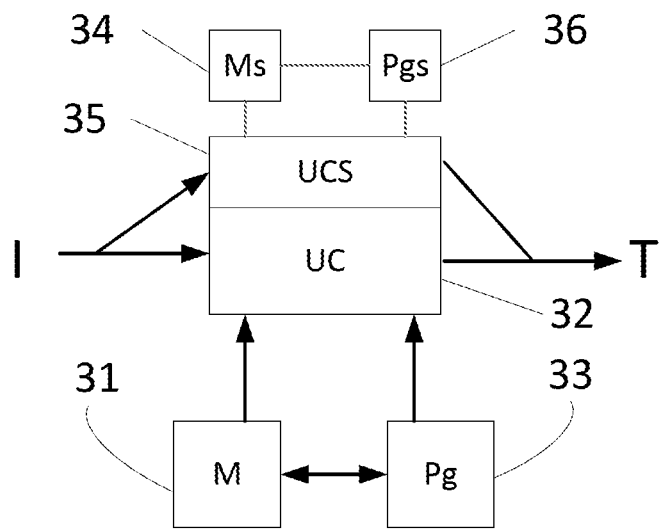
Figure 4:
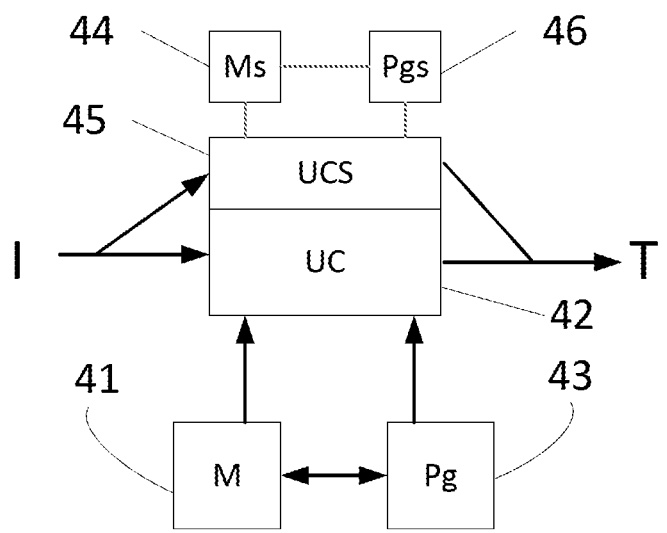

FIG. 3 describes a recording device capable of carrying out the recording of multimedia contents;

FIG. 4 describes a verification device capable of verifying a counterfeiting, if any, of multimedia content.

5. DESCRIPTION

5.1. Reminders

As explained here above, the recording and tracking of the multimedia contents (images, sounds, video) disseminated on an Internet-type communications network has to be facilitated. The approach chosen by the inventors consists, on the whole, in combining the characteristics of content-based retrieval systems with the characteristics of digital watermarking systems in order to propose a novel and inventive recording and tracking.

The methods and systems that are the object of the present invention borrow a two-phase approach from prior-art techniques, that of recording a content to be protected and then tracking the content, for example in order to identify potentially infringing contents or again to broaden existing data bases. However, the approach chosen in the present invention differs from prior-art techniques in that the recording of the content comprises the marking of this content prior to its distribution. The chosen approach also diverges during the tracking of the contents since this tracking also includes the identification of a marking: this makes it possible to obtain descriptive data from the recording data base.

More particularly, through the present technique, the marking carried out during the recording of the content does not require any trade-off between robustness and payload and it thus drastically reduces the probability in CBR systems of detecting false negatives and/or false positives: indeed, since the digital watermarking does not carry descriptive data (as in the prior art), it is possible to integrate a very robust digital watermarking and it is therefore possible to detect a counterfeiting of the content with far greater efficiency.

Besides, the recording is simple: in a single recording phase, the invention implements firstly a recording technique and secondly a watermarking technique. The recording technique is aimed at referencing the contents to be protected. This referencing is carried out specifically in order to ensure a certain degree of robustness of the watermarking that is carried out during the recording phase. Depending on the embodiments, the watermarking for its part is implemented so as to be robust against known attacks. This is achieved by minimizing the messages contained in the watermark, thus enabling an increase in robustness.

From a general viewpoint, the present technique comprises two independent but complementary aspects, namely on the one hand the recording within a data base of a content to be protected and, on the other hand, the detection of a copy of this multimedia content. These two aspects are described with reference to FIGS. 1 and 2.

Figure 1:
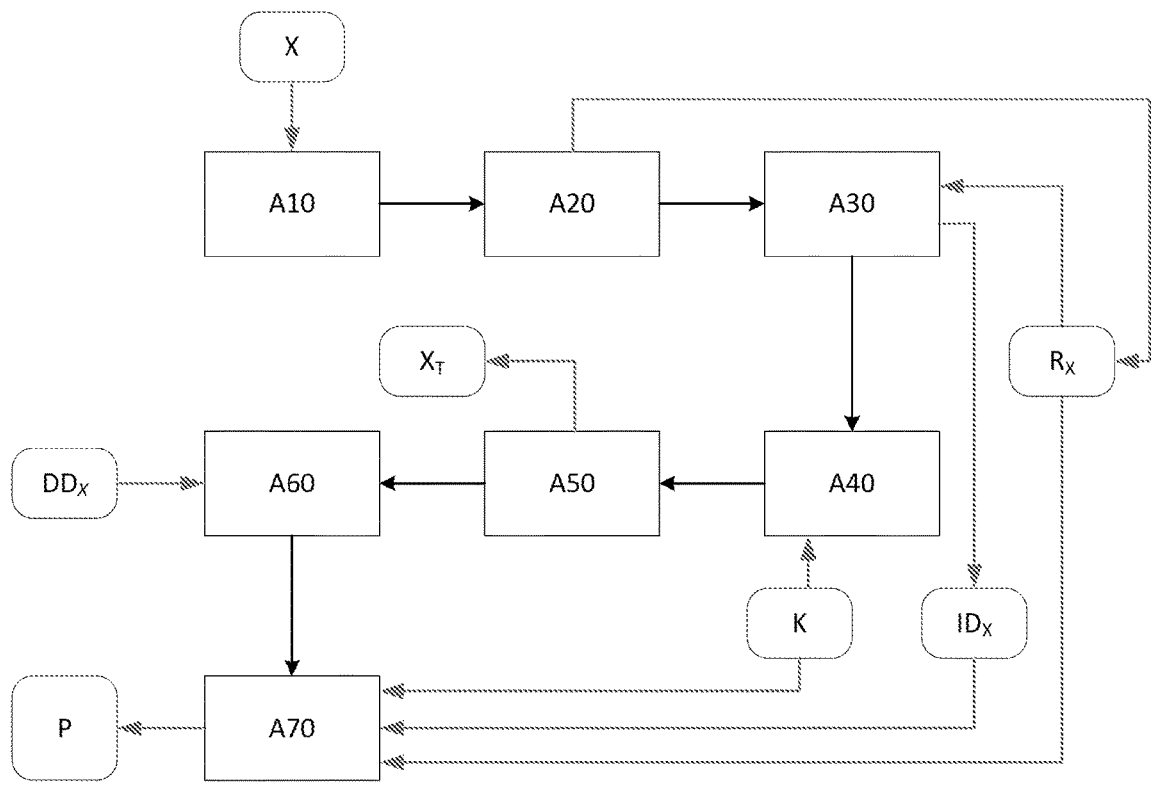
FIG. 1 is a block diagram of the proposed technique in the independent phase for recording multimedia content.

More particularly, FIG. 1 describes a method for recording a multimedia content to be protected within a multimedia recording electronic device, the electronic device comprising means for processing multimedia data. The recording method comprises:

a step for receiving (A10) a multimedia content X;

a step for obtaining (A20) a representation RX of the multimedia content X, the representation RX coming from at least one transformation carried out on the multimedia content X;

a step for obtaining (A30) a unique identifier ($ID_X$) associated with the representation Rx of the multimedia content;

a step for obtaining (A40) a secret key (K) of the multimedia content;

a step for watermarking (A50) the multimedia content (X) by means of a secret key (K), delivering a watermarked content ($X_T$);

a step for obtaining (A60) at least one piece of descriptive data $DD_X$ associated with said multimedia content;

a step (A70) for the insertion, into a data base (P, P), of at least one piece of data constituting the watermark and the descriptive data (DDX).

For example, within the data base (P) a recording is inserted comprising the unique identifier ($ID_X$) the representation Rx and the secret key K.

Thus, the invention provides an advantage that is promising as compared with existing recording systems since the data used to carry out the watermarking are also recorded in a base. Although the method can be implemented linearly, as explained here above, the steps for obtaining descriptive data and inserting it into the data base can be implemented independently of the effective computation of the watermarking. In other words, the computation of the watermarking (steps A10 to A50) can be carried out in a device (for example a camera, a customer device) while the insertion into the base can be carried out on another device (a server for example) using data transmitted from the customer device.

Figure 2:
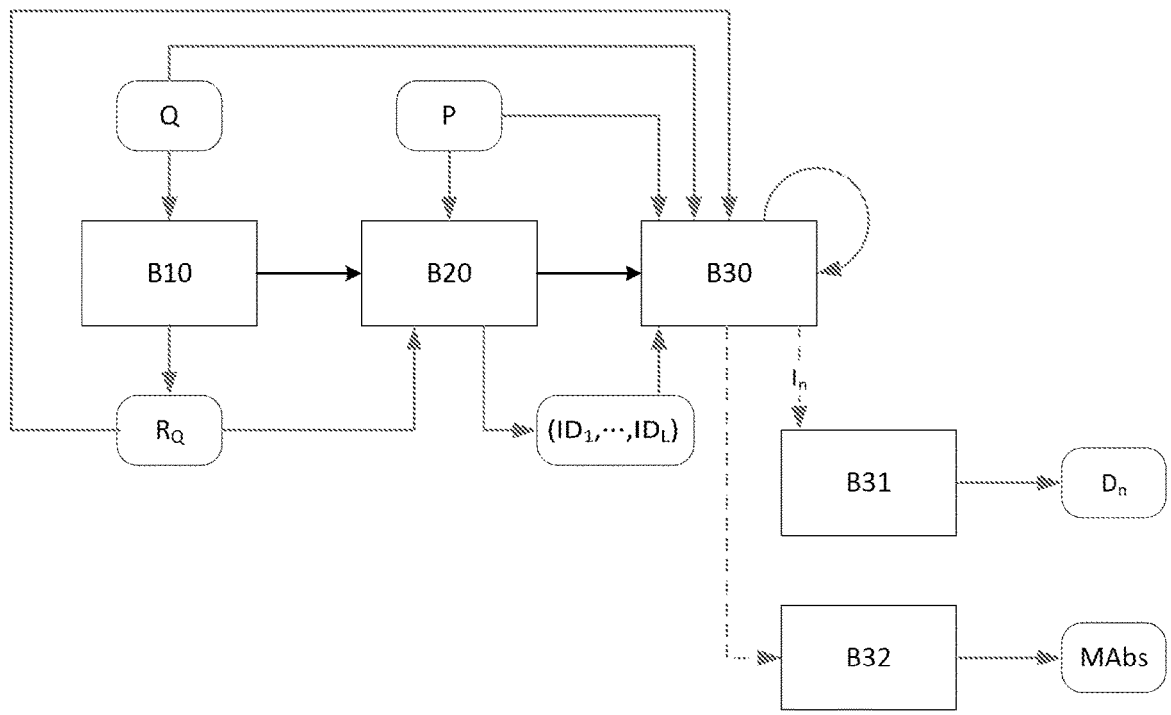
FIG. 2 is a block diagram of the proposed technique in the independent phase for obtaining descriptive information on multimedia content.

FIG. 2 describes a method for obtaining a piece of descriptive data associated with a multimedia content Q, a method implemented by an electronic device for verifying multimedia contents, the electronic device comprising means for processing multimedia data. The method for obtaining comprises the following steps:

obtaining (B10) a representation $R_Q$ of the content Q;

searching (B20), in a data base (P, P), for the representations R closest to the representation $R_Q$ of the content Q, this search delivering an ordered list of identifiers of the closest candidate representations ($ID_1, \ldots, ID_L$);

for each candidate content of the ordered list obtained here above, a step of detection (B30), within the content Q and/or within the representation $R_Q$, of a digital watermark corresponding to one of the digital watermarks of the contents of the list ($ID_1, \ldots, ID_L$); and when the detection is positive, for a content $I_n$ of the list of contents ($I_1, \ldots, I_L$), transmission (B31) of at least one portion of the descriptive data $D_n$ of the content $I_n$ to which the watermarking of the content Q corresponds;

when the detection is negative for all the contents of the list of contents ($I_1, \ldots, I_L$), transmission (B32) of a message on absence of content Q (MAbs).

Thus the technique makes it possible to record the contents to be monitored and to easily retrieve an infringing content from amongst the monitored contents.

Another application of the present invention is that of increasing information related to a content in which the content itself is used as a direct link to additional related contents such as a link to an external website of the content provider, a purchase button or an image, a video, a text or sound. This application also requires identifying the content in a secured and certified manner. The advantage with the proposed technique is that the quantity of descriptive data is not limited, contrary to the prior-art watermarking techniques. It is quite easy to envisage having a large quantity of descriptive data without impairing the efficiency of the protection provided to the content.

The descriptive data can be of two types: permanent descriptive data and temporary descriptive data, as explained here below.

The system procures the following advantages:

First of all, the methods of recording and tracking proposed greatly improve the robustness of the watermarking because of various elements:

they benefit from the structural recording offered by CBR technology, which is carried out before the detection of the watermark. This enables the selection of a watermarking technique that is more lightly robust against techniques of de-synchronization but highly robust against volumetric attacks.

there is no message to be inserted in the image (and therefore in the watermark) but only a mark: this enables the use of more robust watermarking techniques with zero information bits;

the watermarking step, which can bring into a play a plurality of secret keys and selects the best of them (the one that offers the most robustness) makes it possible so to speak to adapt the watermark to the content, as is described below; in addition, in recording only the index of this secret key in a data base, it is only the detection of the secret key that is tested, and this does not modify the probability of a false positive;

finally, at the detection step, the system can have access to the original content, thus enabling the use of informed watermarking techniques which are far more robust than uninformed watermarking techniques.

Secondly, since the descriptive data are, on the one hand, not integrated into the watermark and, on the other hand, dissociated from the content itself, the user can link as many items of descriptive data as he wishes with the content. In addition, the information linked to the content is not linked to the watermarking technique and can therefore be of any kind (other media, social contents, etc.) and can be modified in the course of time.

Thirdly, unlike classical digital watermarking, it is simple to modify the descriptive data associated with the content (or with a version of a content). Indeed, this modification requires a simple modification in a data base without its being necessary to modify the digital watermark itself. The present invention therefore easily resolves this problem of identification related to a watermark.

Fourthly, the tracking method used recognizes a content and produces relevant descriptive data (associated with the recognized content) if and only if the identification is validated both by the descriptive search (the search based on the representations) and by the detection of the corresponding watermark. This extends the list of suitable candidates to contents that would be less similar. Hence, positives through the cross-validation of watermark detection, this approach reduces the number of false negatives without increasing the number of false positives. The prior-art techniques clearly do not produce this effect, obtained by the synergy of descriptive search and watermarking.

Finally, the system is capable of efficiently managing multiple versions of a same content because of the insertion of a different digital watermark into each version of the content. This means that, during the tracking of a counterfeit content, the watermark decoding phase makes it possible to know precisely which is the version of the content that is counterfeit and to do so even in the presence of several dozens of different versions of this content.

5.2. Description of One Embodiment

In this embodiment, the technique is applied to the management of image-type contents. In this embodiment, the system that carries out the recording is the same as the system that verifies the contents. Such a system takes the form of a server comprising means for implementing the methods described and comprising especially means for writing and reading data bases; encryption means, comprising especially encryption key management means, message-encryption means. The system also comprises at least one data base accompanied by a corresponding data-base manager. In this embodiment, there is a recording base P and a indexing structure IdxS that are used differently: one for watermark data and the other for descriptive data.

The method of recording in this embodiment comprises the following steps:

transmission, to said server, of an image I to be recorded and of descriptive data D of this image (the descriptive data can be directly integrated into this image); when several versions of the content exist, at least certain pieces of the descriptive data are different for each of the versions;

computation, by the server, of a representation R of the image I, and computation from this representation of a unique identifier IDI of the image I;

selection, from among a plurality of keys, of a secret key K, associated with said unique identifier ID of the image I;

first insertion, into a table of contents (TC) of the recording data base P, of a recording corresponding to the image I and to the descriptive data and comprising said unique identifier IDI, said secret key K and said representation R; in at least one variant, the pair {IDI, K} forms the primary key of the recording.

second insertion, into an indexing structure (IdxS) of the data base, of the recording comprising said unique identifier IDI and said representation R in such a way that the unique identifier IDI is considered to be a good candidate when a current representation (of a current content to be compared) is similar to the representation R;

it is noted that the indexing structure (IdxS) can very well be the table of contents (TC) itself so that this second insertion step is included in the first insertion step;

creation of a digital watermarking signal in the representation space of the image I, using the secret key K (for example the discrete wavelet transform domain or the discrete cosine transform domain, a signal that is mixed with the original representation of the image I, delivering a watermarked image Iw;

transmission of the watermarked image Iw and optionally of the unique identifier IDI to the user and/or to the system and/or to the device that has submitted the image to the recording device; as a rule, indeed there is no transmission of the unique identifier to the final user (or to any other partners) but only a transmission of the watermarked image Iw, which is sufficient, according to the invention, to obtain descriptive data from the data in interrogating the system; in a way, the watermarked image Iw is itself the access key to the data associated with the image.

As can be seen, the recording delivers a watermarked image Iw and at least one input, in a table of a data base, corresponding to the original image of this watermarked image.

When verifying of a content assumed to be an infringing content Q, the method implemented in the system presented earlier is the following:

computation of a representation $R_Q$ of the image Q.

search, within the indexing structure (IdxS), for the representations R closest to the representation $R_Q$ of the image Q, the search delivering an ordered list of the identifiers of the closest candidate representations $(ID_1, \ldots, ID_L)$;

for each candidate image of the previously obtained ordered list, a step of detection, within the image Q, of a digital watermark corresponding to one of the digital watermarks of the images of the list $(ID_1, \ldots, ID_L)$; and when the detection is positive, for an image $I_n$ of the list of images $(I_1, \ldots, I_L)$, transmission of at least one portion of the descriptive data $D_n$, of the image $I_n$, to which the watermark of the image Q corresponds;

when the detection is negative for all the images of the list of images $(I_1, \ldots, I_L)$, transmission of a message of absence of the image Q.

Thus, we note that the detection of an image is not based only on the presence or non-presence of the image in a base relative to its representation or relative solely to the presence of a digital watermark: on the contrary, this detection is made on the basis of the combination of the use of a representation recorded in a data base and the use of a digital watermark. This has the effect of increasing the chances of discovering a counterfeit because the list of candidates can be lengthened (compared with existing systems) and it is possible to use watermarking methods that are highly resistant to attack.

More particularly, in this embodiment, the step of detection, within the image Q of a digital watermark corresponding to digital watermarks of an image $I_m$ of the list $(ID_1, \ldots, ID_L)$ comprises:

obtaining a secret key $K_m$ corresponding to the $ID_m$ of the image $I_m$;

optionally, realigning the image Q as a function of the structural elements of the representation $R_m$ of the image $I_m$;

detecting the watermark by means of the secret key $K_m$ and optionally of the image $I_m$ (this is the case of an informed detection, see further below).

Thus, in this embodiment, several characteristics are implemented to provide an efficient recording and detection:

At the level of the content recording system:

a compact and discriminating representation of the content is computed;

a measurement is given of the similarity between a query and the representations of the data base;

an efficient (rapid and open-ended) search is provided. This search, made on the basis of a representation of a query and using the indexing structure, looks for the representations in the data base having the greatest similarities;

since the list of candidates is ordered, the search for the watermark takes account of a "probability" of success and is therefore more efficient (it avoids random searches for watermarks);

a computation is made of the representation that comprises structural elements; this corresponds to spatial elements (or temporal elements, or both spatial and temporal elements) of the still image (respectively an audio clip or a video clip); these structural elements can be exploited to record two similar contents on the basis of their representation.

At the level of the digital watermark:

the invention implements a digital watermarking mechanism resistant to attack, for example of the "zero bit" type comprising two parts: integration and detection;

the watermarks integrated into the images are robust;

since the only input taken in the watermarking operation is the content (for example the image I) and a secret key K, the watermarked image produced ($I_w$) carries no information other than this watermark and is therefore not sensitive to watermark detection methods based on integrated messages (for example descriptive data), as in the prior art;

the detection takes as an input a transformed query content and a secret key and optionally the original content corresponding to this secret key. It produces a binary decision ('yes' or 'no') and an optional measurement of the probability of this decision, such as the probability of a "false positive", i.e. the probability of a positive decision during the analysis of the non-watermarked content or the content not watermarked with this secret key.

more particularly, with this technique, to generate a false positive, it is necessary on the one hand that the representations of the two images being compared should be similar and on the other hand that, on the basis of this similarity, by "chance", the secret key should make it possible to retrieve a corresponding digital watermark signal;

thus, with this technique, the probability of obtaining a false positive is drastically reduced.

5.3. Other Features and Advantages

Here below, we present several complementary characteristics that can be ingeniously implemented as a function of embodiments effectively implemented.

5.3.1. Location of the Recording and Watermarking Phase

As explained here above, the instantiation of the link between a content and its descriptive data is carried out in two distinct steps comprising:

the watermarking of the given content in using an (ingeniously chosen) secret key;

the recording of the (original) content and of this secret key in the data base for a subsequent tracking.

In at least one embodiment, two possibilities are offered to carry out the recording: the recording can either be carried out on an online platform or it can be carried out offline.

5.3.1.1. Online Recording

The online recording mode consists in carrying out the recording directly on the basis of an online service proposed by the recording server. The user downloads the content to be protected by means of the online service and retrieves the watermarked copy of this content. He can also edit the descriptive data associated with the content directly from the online service.

In this embodiment, the online service first of all generates a secret key K and optionally stores the original content on the platform. It then applies a watermark derived from the secret key K to the content and stores both the secret key and a content identifier IDI associated solely with the original content and with the user.

The watermarked content is transmitted to the user and can optionally be directly shared with other individuals via the sharing options provided by the online service. The advantage of this system is that it gives the user a unified interface to create the link between descriptive data and content, record these descriptive data and share the content.

5.3.1.2. Offline Recording

As can be seen from the present technique, a content is linked uniquely to its descriptive data provided it is watermarked. It can also be seen clearly from the above description that the watermarking is not directly deduced from the descriptive data, as in the prior art.

As a consequence, the watermarking offers protection of the ownership of the content or of other descriptive data such as a date and a place of capture, by means of the ownership of the secret key K which has been used to generate it. Thus, it is enough to record this key K later in order to support (17/12) the ownership of the link and therefore so that the watermarked content is effectively associated with the corresponding description data recorded with this key.

This enables the implementing of a method in two steps in which the content is watermarked offline in an embedded system such as a smartphone, personal computer or third-party server and subsequently recorded on the recording platform. The advantage of splitting up the two steps is that the content can be protected once it is captured without requiring network connectivity and without incurring any data-processing load on the part of the servers of the recording platform. Besides, only one selection of watermarked content can be recorded, once its value (commercial or other) has been evaluated. This optimizes the number of images recorded in the recording system, in limiting the recording to images having a certain value (commercial or other) while protecting all potentially valuable images that may yet be subsequently recorded.

In order to secure the transmission of the secret watermarking key K of the watermarking system to the recording system, it is possible to use a technique of asymmetrical encryption (system of public/private keys) to encrypt the secret key with the asymmetric public key given by the recording system. During the recording, the recording system decrypts the secret watermarking key by using the asymmetrical private key of the recording system. In this case, the secret watermarking key K can be conveyed with full security along the entire watermarked image content.

More particularly, in one embodiment, the watermarking is carried out as soon as the shot has been taken (for example by smartphone or by means of an adapted image-capturing application) and the encrypted secret key K is directly integrated into the JPEG descriptive data of the file resulting from the capture of an image. The JPEG files are then recorded on the recording platform during a synchronization step once the network connectivity is available.

5.3.2. "Informed" Watermarking and "Uninformed" Watermarking

The purpose of a watermark detector is to detect the presence of a specific signal that has been incorporated into the potentially transformed received content of a query. In general, the original content is not available for the detector. This is why academic research relates chiefly to the uninformed detection of watermarks, i.e. detection with only knowledge of the secret key K and of the query Q (i.e. the content to be tested). However, in the system presented here above, it is easy to store the original content and associate it with the secret K. It is indeed generally necessary to store at least one partial representation of this content to make sure that the step of structural synchronization (also called the step of realignment as a function of structural information) works optimally. As a consequence, the original content, or a partial representation of this original content, can also be used by the watermark detector to improve its trust in the detection of the presence or absence of the watermark signal. Such a system is called an informed watermarking system.

In this section, we shall present the advantages and drawbacks of both systems in the typical context of the applications of the invention and the specific characteristics that therefore apply to the invention.

5.3.2.1. Uninformed Watermarking

An uninformed watermarking system has the advantage of not needing access to the original content to carry out a watermark detection. Only the secret key is needed, thus reducing the storage requirements of the detector to a minimum. If the content signature used by the CBR system is also small, this has the advantage of requiring only a small quantity of memory and a small footprint for the content data base, enabling the detector to be integrated into an external system such as a mobile terminal or enabling the storage of the pair of keys/identifiers in an external public data base system such as a block chain in which the storage space is costly. The use of a block chain type of data base has the additional advantage of encrypting the recording in a secure manner. This can be used to prove the priority of a copy-protected work for example. In the context of image watermarking and of CBR, it is possible for example to use short, overall image descriptors such as GIST or VLAD or descriptors based on CNN which provide efficient signature representations with 128-dimension vectors compatible in size with a typical watermarking key size of 128 bits. With such a system, the image signature and the associated key can be encoded in only a few dozens of bytes. For this particular application, the uninformed watermarking system of the invention works as follows.

For the recording and watermarking of the content, the content is represented in a transformed space such as the (Discrete Wavelet Transform Domain) where a set of coefficients representing the content signal is considered to be a unique high-dimension vector X with a dimension d. From the secret key K, we generate a class of L pseudo-random Gaussian vectors $E^l \in R^d$, $l \in [1, L]$ having the same dimension d, and each vector is normalized such that $\|E^l\|=1$, $\forall l \in \llbracket 1, L \rrbracket$. The vector X of the corresponding signal corresponding to the content is projected into the vector space defined by this family of vectors in such a way that $X^l = X \cdot E^l$.

The index $c = \mathrm{argmax}_{l \in [1,L]} |X^l|$ of the projection with the highest absolute value is chosen as the axis of the detection cone and is memorized in the data base with the secret key. The content vector X is then broken down in its projection on this axis and the projection in the hyperplane orthogonal to this axis, such that $X = x_0 E^c + x_1 E^{c\perp}$, with $|E^{c\perp}|=1$ and $E^{c\perp} \cdot E^c = 0$.

Depending on the power of insertion ρ, the content signal is translated in this 2D space by computing $y_0 = x_0 + w_0$, $y_1 = x_1 - w_1$, where $w_0$ and $w_1$ are chosen to maximize the robustness. These coordinates are also back-projected leading to $Y = y_0 E^c + y_1 E^{c\perp}$, and the watermarking signal W is equal to $W = Y - X$.

The simplest strategy of integration is to add the watermarking signal to the content X to obtain the watermarked content Z, such that $Z = X + W$. However, in order to improve both the robustness and the visual quality, a better strategy is to modulate the watermarking signal with the content signal so that the watermarking signal is stronger at places where the content signal is stronger. The watermarking statistics more closely follow the statistics of the original content, making the watermark more difficult to remove (19/24) and more pleasant from the visual viewpoint. For example, it is possible to use a psychovisual mixing function such that $Z_i = X_i + \log(1+|X_i|) W_i$, $\forall i \in [\![1, d]\!]$ to concentrate the power of the watermarking signal in the regions of interest of the image.

For the detection of the content, on the basis of a content of the query, to determine if a watermark is present in the content, this content is first of all synchronized (realigned) through the structural information of the CBR system.

This leads to a transformed content which has the same dimension and is aligned with the original content. This synchronized (realigned) query content is then transformed in the same representation space used during the insertion, the discrete wavelet transform domain leading to a query vector Q with a dimension d. Given a secret key to test K, the corresponding family $E^l$ of the vectors is generated as had been done in the recording step. The vector Q is projected in $Q = q_0 E^c + q_1 E^{c\perp}$, where c is the direction of projection corresponding to the key K that is extracted from the data base. The detection module computes the probability of a false positive, i.e. the probability that the content Q is watermarked with the key K (whereas it is not), a probability given by:

$$pfa = \beta\left(\frac{L-1}{2}, \frac{1}{2}, 1 - \cos^2(\alpha)\right),$$

with $\cos(\alpha) = \dfrac{q_0}{\sqrt{q_0^2 + q_1^2}}$ and $\beta$ is the incomplete Beta function The content Q is assumed to be a content watermarked with the key K when the computed probability is small, i.e. for example $pfa < 10^{-12}$.

5.3.2.2. Informed Watermarking

Informed watermarking has the advantage of greatly improving the results of the detection in making use of the knowledge of the original content. It is necessary to store the original content X with a secret key K in the recording space and to use this content X at the detection step during the test for the presence of the watermark produced by the secret key K. This system requires more storage than the uninformed watermark but it is also more robust. Should the CBR system already store detailed image characteristics for a retrieval and a synchronization of high quality, it can be that the additional cost of storage of the original content is not a problem and that that it considerably improves the overall quality of the system.

In this application, the informed watermark system differs from the uninformed system as follows, using the previous paragraph notations.

From the secret key K, we generate a pseudo-random Gaussian vector G with a dimension d. It is projected on the hyperplane orthogonal to X and normalized such that $$W = \frac{G - G \cdot X}{\|G - G \cdot X\|}.$$

The vector $\rho W$ is used as a watermark signal where p is used to constrain the watermark distortion, and is combined with X to produce the representation of the watermarked content $Z = X + \rho$, or again more advanced insertion strategies are used, based on a human psychovisual or psychoacoustic system model as explained here above.

The detection is done by projecting the synchronized interrogation signal Q in the same hyperplane used for the insertion and by normalizing it such that $$T = \frac{Q - Q \cdot X}{\|Q - Q \cdot X\|}.$$

It can be noted that the original content X is required to perform this computation. The angle between this trial vector T and the original direction of the watermark W generated from the secret key K directly leads to the probability of a false alarm:

$$pfa = \beta\left(\frac{d-2}{2}, \frac{1}{2}, 1 - \cos^2(\alpha)\right),$$

with $\cos(\alpha) = T \cdot W$ and $\beta$ is the incomplete Beta function

In order to further improve the detection, the original content can be used in the synchronization (realignment) step to fill the missing parts of the content in the query, in the spatial or frequency domain. Indeed, once the query is synchronized to correspond to the original content, the system possesses partial information on the parts of a signal that are entirely missing in the query or have been smoothened owing to the re-sampling (or other modifications). For example, if the original content is a high-resolution image and the query is a partial low-resolution extract, the synchronization step gives knowledge of all the parts of the original content of the extract that are totally absent from the query; the synchronization step also gives the knowledge of the parts that are absent in their high-frequency components (the high frequency corresponding to the high resolution). Hence, of all the choices possible in order to complete the missing parts, it would be useful to fill the missing parts of the query with a signal that introduces no additional noise in the detection of the watermark. Given that the watermarking signal is orthogonal to the original signal, the use of the original signal to fill in the missing parts will result in a correlation that is exactly zero in the watermarked space, reducing the noise introduced by the missing parts solely to the noise due to the loss of the watermarking signal in these regions. Thus, the detection of the watermark is done on the content of the query defined by $Q = X - g(g^{-1}(X)) + g(R)$, where R is the received content and g is the structural and frequency transform estimated from the received content R towards the original content X and $g^{-1}$ is its inverse or pseudo-inverse value.

Through this completion technique, the probability of obtaining a false positive is greatly diminished.

5.3.3. Permanence of Descriptive Data

The storage of descriptive data associated with the content in a separate data base offers the advantage of enabling the editing of this data by the content proprietor (or the copyright manager) at any time. However, this function is not always desirable or it can be limited to certain descriptive data and not to others.

In this case, the descriptive data can be separated into permanent data P and temporary descriptive data T. During the watermarking step, instead of generating the secret key K randomly, the permanent descriptive data P and a secret random vector V can be hashed to form the secret key K=h(P; V). The permanent descriptive data P and the key K are stored in the data base, but are read-only fields while the temporary descriptive data T can be read or written.

Thus, should the permanent descriptive data be modified by a malicious individual, the hash of the secret and the permanent descriptive data would no longer correspond to the secret key and the watermark would not be detected. Since we use a cryptographic hashing, it is very difficult and improbable to find a new vector V' such that the modified permanent descriptive data P' and V' will have the same value K=h (P'; V').

Such a system therefore prevents the usurping or theft of the content link by modifying the permanent descriptive data information and securing the link between the permanent descriptive data and the content.

5.4. Reconstruction of a Content Before Detection

Depending on the embodiments, it is possible, according to the present technique, to envisage the reconstruction of the content (i.e. the query Q transmitted for testing). Such a technique of preliminary reconstruction of the query Q limits the adjoining of non-relevant data during the detection. For example, if the query Q corresponds partially to a known original image X (partially signifying that the query Q is for example truncated so as to show only one portion of the original image X or only one portion of Q belonging to X), the inventors have proposed to rebuild the missing parts of the image Q before the detection. More particularly, this reconstruction consists, in one embodiment, of the use of the estimation of geometrical resetting (delivering a transform) to apply this transform and its reciprocal to the original image. We thus obtain an altered original image that has undergone the same assumed losses as the query image Q (missing zones because of a cutting out, missing high frequencies because of a reduction of dimension). In subtracting this degraded original image from the original image, we obtain the image that "complements" the query image Q in the zones where it is known that the watermarking is absent. Because of the orthogonality of the marking signal to the original image, we thus limit the addition of noise in the detection of the watermark while enabling a smarter and more relevant detection in the event of an infringing of contents.

Typically, in order to further improve the detection, the original content is used in the step of synchronization to fill the missing parts of the content of the query, in the spatial or frequency domain. Indeed, once the query is synchronized to correspond to the original content, the system has at its disposal partial information on those parts of the signal that are entirely absent from the query or that are smoothened because of a re-sampling operation.

For example, if the original content is a high-resolution image and if the query is a low-resolution partial extract, the synchronization step provides knowledge on the parts of the original content that are totally absent from the query, and the common parts do not include the high-frequency components. Hence, among all the possible choices of completeness, it is useful to fill the missing parts in the query with a signal that introduces no additional noise in the detection of the watermark.

Since the watermarking signal is orthogonal to the original signal, the use of the original signal to fill in the missing parts will lead to an absence of correlation in the watermarking space, reducing the noise introduced by missing parts solely to the noise due to the loss of the watermarking signal in these regions. Thus, the detection of the watermark is carried out on the content of the query defined as:

$$Q = X - g(g-1(X)) + g(R),$$

where R is the content received (the query), and g is the structural and frequency transform estimated as a function of the content (of the query) R and of the original content X, and g−1 is the inverse or pseudo-inverse of this transform g.

Through this technique, we greatly improve the quality of detection while limiting the risks of false positives.

5.5. Implementing Devices

Referring to FIG. 3, we describe a multimedia content recording device implemented to manage the registration and marking of multimedia contents to be protected, according to the method described here above.

For example, the multimedia content recording device comprises a memory 31 comprising for example a buffer memory, a general processor 32, equipped for example with a microprocessor and controlled by a computer program 33 and/or a secured memory 34, a secured processor 35, controlled by a computer program 36, these processors implementing data-processing methods as described here above to carry out the recording and the marking of multimedia contents to be protected.

At initialization, the code instructions of the computer program 36 are for example loaded into a memory and then executed by the secured processor 35. The processor 35 inputs at least one multimedia content to be protected. The secured processor 35 carries out the steps of the recording method according to the instruction of the computer program 36 to generate a representation of contents, obtain a unique identifier of this content, obtain a secret watermarking key, and record these pieces of data in a base and watermark the digital content.

To this end, the multimedia content recording device comprises, in addition to the memory 34, communications means such as network communications modules, data transmission means and means for transmitting data among the different components of the multimedia content recording device and read and write access means to at least one data base.

The means described here above can take the form of a particular processor implemented within a terminal such as a communications terminal. According to one particular embodiment, the multimedia content recording device implements a particular application which is in charge of carrying out the operations described here above, this application being for example provided by the manufacturer of the processor in question in order to enable the use of said processor. To this end, the processor comprises a unique identification means. These unique identification means ensure the authenticity of the processor.

Referring to FIG. 4, we describe a device for verifying multimedia contents implemented to manage the verification and detection of potentially infringing contents, according to the method described here above.

For example, the device for verifying multimedia contents comprises a memory 41 comprising for example a buffer memory, a general processor 42, equipped for example with a microprocessor and controlled by a computer program 43 and/or a secured memory 44, a secured processor 45, controlled by a computer program 46, these processors implementing data-processing methods as described here above to carry out the verification of a current content, a verification that is based on a representation of the current content, compared with the representations of the recorded contents, and on the verification of the presence of a watermark on the basis of a secret key accompanying each representation.

At initialization, the code instructions of the computer program 46 are for example loaded into a memory and then executed by the secured processor 45. The processor 45 inputs at least one multimedia content. The secured processor 45 implements the steps of the processing method according to the instructions of the computer program 46 to obtain representations from a data base and detect a watermark, if any, in this representation.

To this end, the device for verifying multimedia contents comprises, in addition to the memory 44, communications means such as network communications modules, data transmission means and circuits for transmitting data among the different components of the device for verifying multimedia contents and the means for read access to a recording data base.

The means described here above can take the form of a particular processor implemented within a terminal, such as a payment terminal. According to one particular embodiment, the device for verifying multimedia content implements a particular application that is in charge of carrying out the operations described here above. This application is for example provided by the manufacturer of the processor in question in order to enable the use of said processor. To this end, the processor comprises unique identifying means. These unique identifying means make it possible to ensure the authenticity of the processor.

The invention claimed is:

1. A method for obtaining a piece of descriptive data associated with a multimedia content (Q), carried out by an electronic device for verifying multimedia contents, said electronic device being configured to process multimedia data, wherein the method comprises:
computing a representation (RQ) of the multimedia content (Q);
searching, within a database (P), for representations (R) closest to the representation (RQ) of the multimedia content (Q), the search delivering an ordered list of identifiers of closest candidate representations (ID1, ..., IDL);
for each candidate content of the previously obtained ordered list, detecting, within the multimedia content (Q), a digital watermark corresponding to one of digital watermarks of the contents of the list, as a function of watermarking keys associated with the contents of the list (ID1, ..., IDL);
when the detecting is positive, for a content (In) of the list of contents (I1, ..., IL), transmitting at least one portion of the piece of descriptive data (Dn) of the content (In) to which the watermark of the multimedia content (Q) corresponds;
when the detecting is negative for all the contents of the list of contents (I1, ..., IL), transmitting a message on absence of multimedia content (Q); and
prior to computing the representation (RQ) of the multimedia content (Q):
obtaining an original content of the multimedia content (Q),
reconstructing the multimedia content (Q) by determining an estimation of geometrical resetting defining a transform, and applying said transform and its reciprocal to the original content, to thereby obtain an additional content, said additional content complementing a query content in at least one zone that the watermarking is absent,
the multimedia content (Q) whose representation (RQ) is computed being the combination of said additional content and said query content.

2. The method for obtaining according to claim 1, wherein said multimedia content (Q) is an image, and the detection, within the image (Q), of a digital watermark of the images of the list ($ID_1$, ..., $ID_L$) comprises, for a current image (Im), m being an integer variable:
obtaining a secret key (Km) corresponding to the (IDm) of the image (Im);
realigning the image (Q) according to structural elements of the representation Rm of the image (Im);
detecting the watermark by using the secret key (Km).

3. The method for obtaining according to claim 2, wherein the realigning the image (Q) as a function of the structural elements of the representation Rm of the image (Im) comprises insertion, into said image (Q), of at least one part of said image (Im), the insertion being carried out as a function of missing parts, if any, of said image (Q) relative to said image (Im).

4. The method for obtaining according to claim 2, wherein the detecting the watermark comprises detecting the watermark by using the secret key (Km) and the image (Im).

5. The method according to claim 1, wherein the method comprises, prior to the obtaining, recording the multimedia content within an electronic device for recording multimedia contents, said electronic device being configured to process multimedia data, the recording comprising:
receiving a multimedia content (X);
obtaining a representation (RX) of said multimedia content (X), said representation (RX) coming from a transformation carried out on said multimedia content (X);
obtaining a unique identifier associated with said representation (RX) of said multimedia content;
obtaining a secret key of said multimedia content;
watermarking said multimedia content (X) by using the secret key (Km), delivering a watermarked content (XT);
obtaining at least one piece of descriptive data (DDX) associated with said multimedia content; and
insertion, within a database (P), of at least one piece of data constituting said watermark and said at least one piece of descriptive data (DDX).

6. The method according to claim 5, wherein the insertion within the database (P) comprises insertion of a record comprising said unique identifier, said representation and said secret key.

7. The method according to claim 5, wherein said watermarking said multimedia content implements a "zero bit" watermarking.

8. The method according to claim 5 wherein the insertion, within the table for recording the contents of the data base, comprises insertion of at least one part of the multimedia content.

9. A electronic device for obtaining a piece of descriptive data associated with a multimedia content (Q), wherein the electronic device comprises:
a processor; and
a non-transitory computer-readable medium comprising instructions stored thereon, which when executed by the processor configure the electronic device to perform acts comprising:
computing a representation (RQ) of the multimedia content (Q);
making a search, within an indexing structure (IdxS), for representations (R) closest to the representation (RQ) of the multimedia content (Q), the search delivering an ordered list of identifiers of the closest candidate representation (ID1, ..., IDL);

detecting, within the multimedia content (Q), a digital watermark corresponding to one of digital watermarks of the contents of the list (ID1, . . . , IDL);

when the detecting is positive, for a content (In) of the list of contents (I1, . . . , IL), transmitting at least one portion of a piece of descriptive data (Dn) of the content (In) to which the watermark of the multimedia content (Q) corresponds;

when the detecting is negative for all the contents of the list of contents (I1, . . . , IL), transmitting a message on an absence of the multimedia contents (Q); and prior to computing the representation (RQ) of the multimedia content (Q):
  obtaining an original content of the multimedia content (Q),
  reconstructing the multimedia content (Q) by determining an estimation of geometrical resetting defining a transform, and applying said transform and its reciprocal to the original content, to thereby obtain an additional content, said additional content complementing a query content in at least one zone that the watermarking is absent, and
  the multimedia content (Q) whose representation (RQ) is computed being the combination of said additional content and said query content.

10. A non-transitory computer-readable medium comprising a computer program product stored thereon, which comprises program code instructions for executing a method for obtaining a piece of descriptive data associated with a multimedia content (Q), carried out by an electronic device for verifying multimedia contents, when the instructions are executed on a processor of the electronic device, wherein the instructions configure the electronic device to:

compute a representation (RQ) of the multimedia content (Q);

search, within a database (P), for representations (R) closest to the representation (RQ) of the multimedia content (Q), the search delivering an ordered list of identifiers of closest candidate representations (ID1, . . . , IDL);

for each candidate content of the previously obtained ordered list, detect, within the multimedia content (Q), a digital watermark corresponding to one of digital watermarks of the contents of the list, as a function of watermarking keys associated with the contents of the list (ID1, . . . , IDL);

when the detection is positive, for a content (In) of the list of contents (I1, . . . , IL), transmit at least one portion of the piece of descriptive data (Dn) of the content (In) to which the watermark of the multimedia content (Q) corresponds;

when the detection is negative for all the contents of the list of contents (I1, . . . , IL), transmit a message on absence of the multimedia content (Q); and prior to computing the representation (RQ) of the multimedia content (Q):
  obtain an original content of the multimedia content (Q),
  reconstruct the multimedia content (Q) by determining an estimation of geometrical resetting defining a transform, and apply said transform and its reciprocal to the original content, to thereby obtain an additional content, said additional content complementing a query content in at least one zone that the watermarking is absent, and
  the multimedia content (Q) whose representation (RQ) is computed being the combination of said additional content and said query content.

* * * * *